(12) United States Patent
Jacobi et al.

(10) Patent No.: US 7,908,183 B2
(45) Date of Patent: *Mar. 15, 2011

(54) RECOMMENDATION SYSTEM

(75) Inventors: Jennifer A. Jacobi, Seattle, WA (US); Eric A. Benson, Seattle, WA (US); Gregory D. Linden, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 1381 days.

This patent is subject to a terminal disclaimer.

(21) Appl. No.: 11/394,999

(22) Filed: Mar. 31, 2006

(65) Prior Publication Data

US 2006/0195362 A1    Aug. 31, 2006

Related U.S. Application Data

(63) Continuation of application No. 09/850,263, filed on May 7, 2001, now Pat. No. 7,113,917, which is a continuation of application No. 09/156,237, filed on Sep. 18, 1998, now Pat. No. 6,317,722.

(51) Int. Cl.
*G06F 19/00* (2011.01)
*G06Q 30/00* (2006.01)

(52) U.S. Cl. .................... 705/26.7; 705/14.53

(58) Field of Classification Search .......... 705/26.7, 705/14.53
See application file for complete search history.

(56) References Cited

U.S. PATENT DOCUMENTS

| | | |
|---|---|---|
| 4,870,579 A | 9/1989 | Hey |
| 4,992,940 A | 2/1991 | Dworkin |
| 4,996,642 A | 2/1991 | Hey |
| 5,235,509 A | 8/1993 | Mueller et al. |
| 5,446,891 A | 8/1995 | Kaplan et al. |
| 5,459,306 A | 10/1995 | Stein et al. |
| 5,583,763 A | 12/1996 | Atcheson et al. |
| 5,615,341 A | 3/1997 | Agrawal et al. |
| 5,704,017 A | 12/1997 | Heckerman et al. |
| 5,724,567 A | 3/1998 | Rose et al. |
| 5,732,398 A | 3/1998 | Tagawa |
| 5,734,885 A | 3/1998 | Agrawal et al. |
| 5,745,681 A | 4/1998 | Levine et al. |
| 5,749,081 A | 5/1998 | Whiteis |
| 5,758,257 A | 5/1998 | Herz et al. |
| 5,758,333 A | 5/1998 | Bauer et al. |
| 5,774,670 A | 6/1998 | Montulli |

(Continued)

FOREIGN PATENT DOCUMENTS

EP    0 265 083    4/1988

(Continued)

OTHER PUBLICATIONS

"Feedforward neural networK", Wikipedia, downloaded Jan. 28, 2011.*

(Continued)

*Primary Examiner* — Donald L Champagne
(74) *Attorney, Agent, or Firm* — Knobbe, Martens, Olson & Bear LLP

(57) ABSTRACT

A computer-implemented service analyzes purchase histories and/or other types of behavioral data of users on an aggregated basis to detect and quantify associations between particular items represented in an electronic catalog. The detected associations are stored in a mapping structure that maps items to related items, and is used to recommend items to users of the electronic catalog. The items may include products and/or categories of products.

27 Claims, 7 Drawing Sheets

U.S. PATENT DOCUMENTS

| | | | |
|---|---|---|---|
| 5,774,868 A * | 6/1998 | Cragun et al. .................. | 705/10 |
| 5,790,426 A | 8/1998 | Robinson | |
| 5,790,935 A | 8/1998 | Payton | |
| 5,794,209 A | 8/1998 | Agrawal et al. | |
| 5,794,210 A | 8/1998 | Goldhaber et al. | |
| 5,842,200 A | 11/1998 | Agrawal et al. | |
| 5,867,799 A | 2/1999 | Lang et al. | |
| 5,872,850 A | 2/1999 | Klein et al. | |
| 5,884,282 A | 3/1999 | Robinson | |
| 5,905,973 A | 5/1999 | Yonezawa et al. | |
| 5,909,023 A | 6/1999 | Ono et al. | |
| 5,909,492 A | 6/1999 | Payne et al. | |
| 5,918,014 A | 6/1999 | Robinson | |
| 5,920,855 A | 7/1999 | Aggarwal et al. | |
| 5,974,396 A | 10/1999 | Anderson et al. | |
| 6,003,029 A | 12/1999 | Agrawal et al. | |
| 6,006,218 A | 12/1999 | Breese et al. | |
| 6,006,225 A | 12/1999 | Bowman et al. | |
| 6,016,475 A | 1/2000 | Miller et al. | |
| 6,018,738 A | 1/2000 | Breese et al. | |
| 6,029,139 A | 2/2000 | Cunningham et al. | |
| 6,029,182 A | 2/2000 | Nehab et al. | |
| 6,029,195 A | 2/2000 | Herz | |
| 6,041,311 A | 3/2000 | Chislenko et al. | |
| 6,049,777 A | 4/2000 | Sheena et al. | |
| 6,055,513 A | 4/2000 | Katz et al. | |
| 6,064,980 A | 5/2000 | Jacobi et al. | |
| 6,078,740 A | 6/2000 | DeTreville | |
| 6,084,528 A | 7/2000 | Beach et al. | |
| 6,092,049 A | 7/2000 | Chislenko et al. | |
| 6,108,493 A | 8/2000 | Miller et al. | |
| 6,112,186 A | 8/2000 | Bergh et al. | |
| 6,144,964 A | 11/2000 | Breese et al. | |
| 6,195,657 B1 | 2/2001 | Rucker et al. | |
| 6,202,058 B1 | 3/2001 | Rose et al. | |
| 6,266,649 B1 * | 7/2001 | Linden et al. .................. | 705/10 |
| 6,317,722 B1 | 11/2001 | Jacobi et al. | |
| 6,321,221 B1 | 11/2001 | Bieganski | |
| 6,330,592 B1 | 12/2001 | Makuch et al. | |
| 6,334,127 B1 | 12/2001 | Bieganski et al. | |
| 6,356,879 B2 | 3/2002 | Aggarwal et al. | |
| 6,460,036 B1 | 10/2002 | Herz | |
| 6,484,149 B1 | 11/2002 | Jammes et al. | |
| 6,507,872 B1 | 1/2003 | Geshwind | |
| 6,587,127 B1 | 7/2003 | Leeke et al. | |
| 6,629,079 B1 | 9/2003 | Spiegel et al. | |
| 6,691,163 B1 | 2/2004 | Tufts | |
| 6,782,370 B1 | 8/2004 | Stack | |
| 6,912,505 B2 * | 6/2005 | Linden et al. ............... | 705/14.53 |
| 6,996,572 B1 | 2/2006 | Chakrabarti et al. | |
| 7,155,401 B1 | 12/2006 | Cragun et al. | |
| 2001/0013009 A1 | 8/2001 | Greening et al. | |
| 2001/0014868 A1 | 8/2001 | Herz et al. | |

FOREIGN PATENT DOCUMENTS

| | | | |
|---|---|---|---|
| EP | 0 751 471 A | 1/1997 | |
| EP | 0 827 063 A | 3/1998 | |
| GB | 2 336 925 A | 3/1999 | |

OTHER PUBLICATIONS

Apte, C., "Data Mining—An Industrial Research Perspective", IEEE Computational Science and Engineering, Apr.-Jun. 1997; found online with the Google search made of record herewith and downloaded Jan. 28, 2011.*

Upendra Shardanand and Pattie Maes with MIT Media-Lab, Social Information Filtering: Algorithms for Automating "Word of Mouth", 8 pgs (undated).

Combining Social Networks and Collaborative Filtering, Communications of the ACM, Mar. 1997/vol. 40, No. 3, pp. 63-65.

Pointing the Way: Active Collaborative Filtering, CHI '95 Proceedings Papers, 11 pgs.

Bradley N. Miller, John T. Riedl, and Joseph A. Konstan with Department of Computer Science, University of Minnesota, Experiences with GroupLens: Making Usenet Useful Again, 13 pgs.

A System for Sharing Recommendations, Communications of the ACM, Mar. 1997/vol. 40, No. 3, pp. 59-62.

Recommender Systems for Evaluating Computer Messages, Communications of the ACM, Mar. 1997/vol. 40, No. 3, pp. 88 and 89.

Content-Based, Collaborative Recommendation, Communications of the ACM, Mar. 1997/vol. 40, No. 3, pp. 66-72.

Applying Collaborative Filtering to Usenet News, Communications of the ACM, Mar. 1997/vol. 40, No. 3, pp. 77-87.

Personalized Navigation for the Web, Communications of the ACM, Mar. 1997/vol. 40, No. 3, pp. 73-76.

GroupLens: An Open Architecture for Collaborative Filtering of Netnews, 18 pgs.

Net Perceptions, Inc., White Paper, Building Customer Loyalty and High-Yield Relationships Through GroupLens Collaborative Filtering, 9 pgs., Nov. 22, 1996.

Christos Faloutsos and Douglas Oard with University of Maryland, A Survey of Information Retrieval and Filtering Methods, 22 pgs (undated).

Joaquin Delgado, "Intelligent Collaborative Information Retrieval".

Joaquin Delgado, "Content-based Collaborative Information Filtering".

Marko Balabanovic and Yoav Shoham, "Content-Based, Collaborative Recommendation," Communications of the ACM, vol. 40n3, pp. 66-72, dated Mar. 1997.

"COSMOCOM," Computer Telephony, p. 124, dated Jul. 1998.

Brier, S.E., "Smart Devices Peep Into Your Grocery Cart," New York Times Co., Section G, p. 3, col. 3, Circuits, dated Jul. 1998.

Nash, E.L., "Direct Marketing; Strategy, Planning, Execution," $3^{rd}$ Ed., McGraw-Hill, Inc., pp. 165, & 365-6. (1994).

"iCatElectronic Commerce Suite Takes 'Best of Show' Award At WebINNOVATION 97," PR Newswire, Jun. 1997.

"iCatElectronic Corporation: iCat's Commerce Suite Makes Setting Up Shop on 'Net Even Easier Than High Street," M2 Presswire, dated Feb. 1997.

Dragan et al., "Advice From the Web," PC Magazine, v. 16, n. 15, p. 133, dated Sep. 1997.

"Able Solutions Announces Able Commerce 2.6," PR Newswire, dated Sep. 1998.

"Internet World—IBM to Expand E-Comm Features," Newsbytes News Network, dated Dec. 1996.

McMains, A., "Weiss, Whitten, Staliano's," ADWEEK Eastern Edition, V. 39, N. 24, p. 82, dated Jun. 1998.

"Cdnow Rated Top Music Site by eMarketer, the Authority on Business Online," PR Newswire, dated Sep. 1998.

"Net Perceptions Closes Second Round of Financing: GroupLens secures No. 1 recommendation system spot with strong endorsement by investment community," Business Wire, p. 3020013, Dialog File 16, AN 05495619, dated Mar. 1998.

"LinkShare Launches Affiliates Profiling Software; First to Integrate Personalization Software Into Affiliates Program," PR Newswire, LinkShare Corp., Dialog File 813, AN 1232636, dated Feb. 1998.

"Fort Point Partners Teams With LikeMinds to Offer Breakthrough Personalization Technology for Increased Sales Online," Business Wire, p. 3110064, Dialog File 16, AN 05510541, dated Mar. 1998.

"Net Perceptions Debuts GroupLens Version 3.0 at Internet World Spring; 'Industrial Strength Tool Matures Into Essential Website Technology'," Business Wire, p. 3090007, Dialog File 16, AN 05505690, dated Mar. 1998.

"Home Box Office Selects Like Minds Personalization Software for Second Network Site," PR Newswire, p. 1117SFM023, Dialog File 148, AN 09869396, dated Nov. 1997.

"GroupLens Recommendation Engine to Standarize Internet Personalization for Singapore's Online Technologies Consortium," Business Wire, Dialog File 20, AN 01951318, Jun. 1998.

Borchers, A. et al., "Ganging up on Information Overload," Computer, pp. 106-108, dated Apr. 1998.

Konstan, J. et al., "GroupLens: Applying Collaborative Filtering to Usenet News," Communications of the ACM, vol. 30, No. 3, pp. 77-87, dated Mar. 1997.

Miller, B. et al.., "Experiences with GroupLens: Making Usenet Useful Again," USENIX Association 1997 Annual Technical Conference, pp. 219-232.

Resnick, P. et al., "Recommender Systems," Communications of the ACM, vol. 40, No. 3, pp. 56-58, dated Mar. 1997.

Rucker, J. et al., "Siteseer: Personalized Navigation for the Web," Communications of the ACM, vol. 40, No. 3, pp. 73-76, dated Mar. 1997.
Description in IDS dated May 7, 2001 in parent U.S. Appl. No. 09/850,263 of Amazon.com's "book information page" feature.
Watt, P., *"Varied Collaborative Approaches Entice Intranet Users,"* NetworkWorld, vol. 14, Issue 16, p. S14, dated Apr. 21, 1997 (4 pages printed from ProQuest).
Hibbard, J.,*"Just Add People, Collaborative filtering brings human input to information retrieval in the enterprise,"* Dec. 22, 1997 issue of Information Week, p. 65.
R. Agrawal et al, *"Mining association rules between sets of items in large databases,"* Proceedings of the 1993 ACM SIGMOD International Conference on Management of Data, pp. 207-216, 1993.
"A. 'Obvious to Try' Motivation Insufficient," JTPOS, vol. 86, No. 10, Oct. 2004: 838.
Complaint for Patent Infringement, dated May 15, 2009, in matter of *Amazon.com, Inc.* v. *Discovery Communications, Inc.* (case No. C09-0681 RSL).
Defendant Discovery Communications, Inc.'s Answer to the Complaint, dated Jul. 23, 2009, in matter of *Amazon.com, Inc.* v. *Discovery Communications, Inc.* (case No. 2:09-cv-0681-RSL).
Defendant Discovery Communications, Inc.'s Local Patent Rule 121 Invaliditiy Contentions, dated Nov. 16, 2009, in matter of *Amazon.com, Inc.* v. *Discovery Communications, Inc.* (case No. 2:09-cv-0681-RSL).
Defendant Discovery Communications, Inc.'s First Amended Answer, Defenses, & Counterclaims, dated Jan. 25, 2010, in matter of *Amazon.com, Inc.* v. *Discovery Communications, Inc.* (case No. 2:09-cv-0681-RSL).
Plaintiff Amazon.com, Inc.'s Reply to Defendant Discovery Communications, Inc.'s First Amended Answer, Defenses and Counterclaims, dated Feb. 23, 2010, in matter of *Amazon.com, Inc.* v. *Discovery Communications, Inc.* (case No. 2:09-cv-0681-RSL).
Joint Claim Construction and Prehearing Statement, dated Oct. 25, 2010, in matter of *Amazon.com, Inc.* v. *Discovery Communications, Inc.* (case No. 2:09-cv-0681-RSL).
Joint Claim Chart (Exhibit A) dated Oct. 25, 2010, in matter of *Amazon.com, Inc.* v. *Discovery Communications, Inc.* (case No. 2:09-cv-0681-RSL).
Plaintiff Amazon.com, Inc.'s Opening Claim Construction Brief Covering U.S. Patent Nos. 6,006,225; 6,169,986; 6,266,649 and 6,317,722, dated Nov. 11, 2010, in matter of *Amazon.com, Inc.* v. *Discovery Communications, Inc.* (case No. 2:09-cv-0681-RSL).
Defendant Discovery Communications, Inc.'s Opening Claim Construction Brief, dated Nov. 11, 2010, in matter of *Amazon.com, Inc.* v. *Discovery Communications, Inc.* (case No. 2:09-cv-0681-RSL).
Plaintiff Amazon.com, Inc.'s Responsive Claim Construction Brief Covering U.S. Patent Nos. 6,006,225; 6,169,986; 6,266,649 and 6,317,722, dated Dec. 2, 2010, in matter of *Amazon.com, Inc.* v. *Discovery Communications, Inc.* (case No. 2:09-cv-0681-RSL).
Discovery Communications, Inc.'s Responsive Claim Construction Brief, dated Dec. 2, 2010, in matter of *Amazon.com, Inc.* v. *Discovery Communications, Inc.* (case No. 2:09-cv-0681-RSL).
Exhibit D-1: Invalidity Chart for the Linden '649 Patent Based on Gustos Publication and Product ("Gustos"), in matter of *Amazon.com, Inc.* v. *Discovery Communications, Inc.* (case No. 2:09-cv-0681-RSL).
Exhibit D-2: Invalidity Chart for the Linden '649 Patent Based on Amazon.com Website ("Amazon.com"), in matter of *Amazon.com, Inc.* v. *Discovery Communications, Inc.* (case No. 2:09-cv-0681-RSL).
Exhibit D-3: Invalidity Chart for the Linden '649 Patent Based on U.S. Patent No. 6,782,370 to Stack ("Amazon.com"), in matter of *Amazon.com, Inc.* v. *Discovery Communications, Inc.* (case No. 2:09-cv-0681-RSL).
Exhibit D-4: Invalidity Chart for the Linden '649 Patent Based on U.S. Patent No. 6,334,127 to Bieganski (Filed Jul. 17, 1998, and Issued Dec. 25, 2001) ("Bieganski '127"), in matter of *Amazon.com, Inc.* v. *Discovery Communications, Inc.* (case No. 2:09-cv-0681-RSL).
Exhibit D-5: Invalidity Chart for the Linden '649 Patent Based on U.S. Patent No. 5,749,081 to Whiteis (Filed Apr. 6, 1995, and Issued May 5, 1998) ("Whiteis '081"), in matter of *Amazon.com, Inc.* v. *Discovery Communications, Inc.* (case No. 2:09-cv-0681-RSL).
Exhibit D-6: Invalidity Chart for the Linden '649 Patent Based on U.S. Patent No. 5,583,763 to Atcheson (Filed Sep. 9, 1993, and Issued Dec. 10, 1996) ("Atcheson '763"), in matter of *Amazon.com, Inc.* v. *Discovery Communications, Inc.* (case No. 2:09-cv-0681-RSL).
Exhibit E-1: Invalidity Chart for Jacobi '722 Patent Based on Gustos Publication and Product ("Gustos"), in matter of *Amazon.com, Inc.* v. *Discovery Communications, Inc.* (case No. 2:09-cv-0681-RSL).
Exhibit E-2: Invalidity Chart for Jacobi '722 Patent Based on Amazon.com Website, in matter of *Amazon.com, Inc.* v. *Discovery Communications, Inc.* (case No. 2:09-cv-0681-RSL).
Exhibit E-3: Invalidity Chart for Jacobi '722 Patent Based on U.S. Patent No. 6,782,370 to Stack (Filed Sep. 4, 1997, and Issued Aug. 24, 2004) ("Stack '370"), in matter of *Amazon.com, Inc.* v. *Discovery Communications, Inc.* (case No. 2:09-cv-0681-RSL).
Exhibit E-4: Invalidity Chart for Jacobi '722 Patent Based on U.S. Patent No. 6,334,127 to Bieganski (Filed Jul. 17, 1998, and Issued Dec. 25, 2001) ("Bieganski '127"), in matter of *Amazon.com, Inc.* v. *Discovery Communications, Inc.* (case No. 2:09-cv-0681-RSL).
Exhibit E-5: Invalidity Chart for Jacobi '722 Patent Based on U.S. Patent No. 5,749,081 to Whiteis (Filed Apr. 6, 1995, and Issued May 5, 1998) ("Whiteis '081"), in matter of *Amazon.com, Inc.* v. *Discovery Communications, Inc.* (case No. 2:09-cv-0681-RSL).
Exhibit E-6: Invalidity Chart for Jacobi '722 Patent Based on U.S. Patent No. 5,583,763 to Atcheson (Filed Sep. 9, 1993, and Issued Dec. 10, 1996) ("Atcheson '763"), in matter of *Amazon.com, Inc.* v. *Discovery Communications, Inc.* (case No. 2:09-cv-0681-RSL).
Exhibit F-1: titled "Other Prior Art that Discloses or Renders Obvious Limitations of Amazon's '649 and '722 Patents," in matter of *Amazon.com, Inc.* v. *Discovery Communications, Inc.* (case No. 2:09-cv-0681-RSL).
Joshua Alspector et al., "Feature-based and Clique-based User Models for Movie Selection: A Comparative Study," in User Modeling and User-Adapted Interaction 7, pp. 279-304, dated 1997.
"Internet Shopping Threatens Retailers," Reuters, DowJones, p. 1 of 2 (2009) Factiva, Inc.
Al Borchers, et al., "Ganging up on Information Overload," University of Minnesota, Internet Watch, pp. 106-108, (Apr. 1998).
Tim Dorgan, "Belief in the Future," Progressive Grocer; Feb. 1997; vol. 76, No. 2; ABI/INFORM Global, pp. 67-68.
Greg Elofson, et al., "Creating a Custom Mass-Production Channel on the Internet," Communications of the ACM, Mar. 1998, vol. 41, No. 3, pp. 57-62.
Greg Enright, "Collaborative Filtering Weeds out Irrelevant Data," in Information World Canada, Sep. 1997, vol. 22, No. 9; ABI/INFORM Global, p. 11.
"Firefly Technology: Tools for Cultivating Profitable Customer Relationships," printed from http://web.archive.org/web/19970116111618/www.firefly.net/technology.htm.
D. Fisk, "An Application of Social Filtering to Movie Recommendation," Software Agents and Soft Computing Towards Enhancing Machine Intelligence, Data Mining Group, BT Laboratories, Lecture Notes in Computer Science, ISSN: 0302-9743 (print), vol. 1198/1997, pp. 116-131, printed on Oct. 29, 2009, from springerlink.com/.../ek4665q6h51072w.
Natalie Glance, et al., "Knowledge Pump: Community-centered Collaborative Filtering," Xerox Research Centre Europe, Grenoble Laboratory, pp. 1-5, Oct. 27, 1997.
Gustos, "Why You Should Use Gustos?" printed from http://web.archive.org/web/19980131020417/www.gustos.com/applications.html.
Justin Hibbard, "Just Add People," Information Week, vol. 662, ABI/INFORM Global, p. 65, Dec. 22, 1997.
Paul N. Hodgdon, "The Role of Intelligent Agent Software in the Future of Direct Response," Direct Response, Direct Marketing, pp. 10-17, Jan. 1997.
Marguerite Holloway, "Wired," printed from http://wired.com/wired/archive/5.12/maes_pr.html, pp. 1-7, dated Nov. 4, 2009.
Thorsten Joachims, et al., "WebWatcher: A Tour Guide for the World Wide Web," in 6 pages.

Bruce Krulwich, "Lifestyle Finder, Intelligent User Profiling Using Large-Scale Demographic Data," AI Magazine, American Association for Artificial Intelligence, pp. 37-45, Summer 1997.

Len Lewis, "Short Circuits," One-click shopping, Progressive Grocer, vol. 76, No. 7, ABI/INFORMAL Global, p. 80, Jul. 1997.

Paul McJones, et al., "SRC Technical Note," Each to Each Programmer's Reference Manual, Digital Equipment Corporation, p. 1-16, dated Oct. 1, 1997.

David M. Nichols, et al., "Recommendation and Usage in the Digital Library," Lancaster University Computing Department, Cooperative Systems Engineering Group, pp. 1-15, (1997).

Catherine Applefeld Olson, "Merchants & Marketing," Software Aims to Personalize Net Retailing, Billboard, Research Library, vol. 110, No. 13, 2 pages, dated Mar. 28, 1998.

Rose, Daniel E., et al., "MessageWorld: A New Approach to Facilitating Asynchronous Group Communication," CIKM '95, ACM 0-89791-812-6, pp. 266-273, (1995).

Curt Stevens, "Automating the Creation of Information Filters," Communications of the ACM, vol. 35, No. 12, Dec. 1992.

Loren G. Terveen, et al., "Building Task-Specific Interfaces to High Volume Conversational Data," Papers, CHI 97, Atlanta, GA, ACM 0-89791-802-9/97/03, pp. 226-233, Mar. 22-27, 1997.

"TVISIONS Delivers Harvard Business School Publishing Onto World Wide Web," PR Newswire, dated Jul. 16, 1996.

"The WEBDOGGIE Personalized Document Filtering System," 3 pages printed from http://web.archive.org/web19961213005420/http://webhound.www.media.mit.edu/projects/webhound/doc/webhound.html.

Stephen H. Wildstrom, "Service with a Click," BusinessWeek, Technology & You, No. 3519, p. 19, dated Mar. 24, 1997.

Decision issued by EPO on Dec. 13, 2010, in European Appl. No. 99 951 441.7.

Answer and CounterclaimS of Amazon.com, Inc., filed Dec. 14, 2006, in matter of *IBM v. Amazon.com, Inc.* (case 6:06-cv-452-LED).

Plaintiff and counterclaim-defendant International Business Machines Corporation's Reply, Affirmative defenses and Counterclaims to Amazon.com's Counterclaims, dated Jan. 8, 2007, in matter of *IBM v. Amazon.com, Inc.* (case 6:06-cv-452-LED).

Defendant and Counterclaim-Plaintiff Amazon.com, Inc.'s Reply to IBM's Affirmative Defenses and Counterclaims, dated Jan. 29, 2007, in matter of *IBM v. Amazon.com, Inc.* (case 6:06-cv-452-LED).

International Business Machines Corporation's Patent Rule 3-3 Invalidity Contentions and Patent Rule 3-4 Document Production dated Apr. 27, 2007 ("IBM's Invalidity Contentions"), in matter of *IBM v. Amazon.com, Inc.* (case 6:06-cv-452).

Appendices A1 and A2 of IBM's Invalidity Contentions dated Apr. 27, 2007, in matter of *IBM v. Amazon.com, Inc.* (case 6:06-cv-452).

Appendices A3 and A4 of IBM's Invalidity Contentions dated Apr. 27, 2007, in matter of *IBM v. Amazon.com, Inc.* (case 6:06-cv-452).

Appendices A5 and A6 of IBM's Invalidity Contentions dated Apr. 27, 2007, in matter of *IBM v. Amazon.com, Inc.* (case 6:06-cv-452).

Appendices A7 and A8 of IBM's Invalidity Contentions dated Apr. 27, 2007, in matter of *IBM v. Amazon.com, Inc.* (case 6:06-cv-452).

Appendices A9 and A10 of IBM's Invalidity Contentions dated Apr. 27, 2007, in matter of *IBM v. Amazon.com, Inc.* (case 6:06-cv-452).

Appendices A11 and A12 of IBM's Invalidity Contentions dated Apr. 27, 2007, in matter of *IBM v. Amazon.com, Inc.* (case 6:06-cv-452).

Appendices A13 and A14 of IBM's Invalidity Contentions dated Apr. 27, 2007, in matter of *IBM v. Amazon.com, Inc.* (case 6:06-cv-452).

Appendices A15 and A16 of IBM's Invalidity Contentions dated Apr. 27, 2007, in matter of *IBM v. Amazon.com, Inc.* (case 6:06-cv-452).

Appendix A17 of IBM's Invalidity Contentions dated Apr. 27, 2007, in matter of *IBM v. Amazon.com, Inc.* (case 6:06-cv-452).

Appendix A18 of IBM's Invalidity Contentions dated Apr. 27, 2007, in matter of *IBM v. Amazon.com, Inc.* (case 6:06-cv-452).

Appendix A19 of IBM's Invalidity Contentions dated Apr. 27, 2007, in matter of *IBM v. Amazon.com, Inc.* (case 6:06-cv-452).

Appendix A20 of IBM's Invalidity Contentions dated Apr. 27, 2007, in matter of *IBM v. Amazon.com, Inc.* (case 6:06-cv-452).

Appendix A21 of IBM's Invalidity Contentions dated Apr. 27, 2007, in matter of *IBM v. Amazon.com, Inc.* (case 6:06-cv-452).

Appendix A22 of IBM's Invalidity Contentions dated Apr. 27, 2007, in matter of *IBM v. Amazon.com, Inc.* (case 6:06-cv-452).

Appendix A23 of IBM's Invalidity Contentions dated Apr. 27, 2007, in matter of *IBM v. Amazon.com, Inc.* (case 6:06-cv-452).

Appendix A24 of IBM's Invalidity Contentions dated Apr. 27, 2007, in matter of *IBM v. Amazon.com, Inc.* (case 6:06-cv-452).

Appendix A25 of IBM's Invalidity Contentions dated Apr. 27, 2007, in matter of *IBM v. Amazon.com, Inc.* (case 6:06-cv-452).

Appendix B of IBM's Invalidity Contentions dated Apr. 27, 2007, in matter of *IBM v. Amazon.com, Inc.* (case 6:06-cv-452).

Agrawal, R., et al., "Mining Association Rules between Sets of Items in Large Databases," Proceedings of the 1993 ACM, SIGMOD International Conference on Management of Data, pp. 207-216, Washington D.C. (May 1993).

Agrawal, R., et al., "Fast Algorithms for Mining Association Rules," Proceedings 20th International Conference on Very Large Databases, {VLDB}, pp. 487-499, Santiago, Chile, (Sep. 1994).

Agrawal, R., et al., "Fast Algorithms for Mining Association Rules," IBM Research Report RJ9839, 31 pages, dated Nov. 16, 1994.

Agrawal, R., et al., "Active Data Mining," IBM Alameden Research Center, Proceedings of the 1st International Conference on Knowledge Discovery in Databases and Data Mining, KDD-95, (1995).

Agrawal, R., et al., "Mining Sequential Patterns," IBM Alameden Research Center, Proceedings of the 11th International Conference on Data Engineering, Taipei, Taiwan, (Mar. 1995).

Srikant, R., et al., "Mining Generalized Association Rules," IBM Alameden Research Center, Proceedings of the 21st International Conference on Very Large Databases, Zurich, Switzerland, (Sep. 1995).

Srikant, R. et al., "Mining Sequential Patterns: Generalizations and Performance Improvements," Proceedings of the Fifth International Conference on Extending Database Technology (EDBT), Avignon, France, (1996).

Agrawal, R., et al., "Parallel Mining of Association Rules," IEEE Transactions on Knowledge and Data Engineering, vol. 8, No. 6, (Dec. 1996).

Agrawal, R., et al., "Developing Tightly-Coupled Data Mining Applications on a Relational Database System," IBM Alamaden Research Center, Proceedings of the Second International Conference on Knowledge Discovery and Data Mining, KDD-96 Proceedings, (1996).

Agrawal, R., et al., "Parallel Mining of Association Rules: Design, implementation, and experience," IBM Research Division, Alamaden Research Center, IBM Research Report RJ10004, Computer Science/Mathematics, dated Feb. 1, 1996.

Srikant, R., et al., "Mining Quantitative Association Rules in Large Relational Tables," IBM Alamaden Research Center, Proceedings of the ACM SIGMOD Conference on Management of Data, Montreal, Canada, (Jun. 1996).

Agrawal, R., et al., "The Quest Data Mining System," Proceedings 1996 International Conference Data Mining and Knowledge Discovery (KDD'96), pp. 244-249, Portland, Oregon, (Aug. 1996).

Salton, G., et al., "Computer Evaluation of Indexing and Text Processing," The SMART Retrieval System: Experiments in Automatic Document Processing, Prentice-Hall, (1971).

Order Construing Claims issued on Jan. 11, 2011, in case No. 2:09-cv-00681-RSL (13 pages).

Yezdezard Zerxes Lashkari, "Feature Guided Automated Collaborative Filtering," B. Tech, Computer Science and Engineering, Indian Institute of Technology, Bombay (May 1991).

"IBM announces data mining solution for improved decision making; new ammo for knowledge discovery and validation of business intelligence," Business Wire, pp. 1-4, dated Apr. 9, 1996.

Gifford, David K., et al., "Payment Switches for Open Networks," Proceedings of the First USENIX Workshop on Electronic Commerce, New York, New York, pp. 1-8 (Jul. 1995).

Karlgren, Jussi, "Newsgroup Clustering Based on User Behavior—A Recommendation Algebra," SICS Technical Report, T94:04, ISSN 1100-3154.

Lieberman, Henry, "Letizia: An Agent That Assists Web Browsing," Media Laboratory, Massachusetts Institute of Technology, pp. 1-6 (undated).

Mobasher, Bamshad, et al., "Automatic Personalization Based on Web Usage Mining," printed from http://maya.cs.depaul.edu/~mobasher/personalization/index.html (1 de 24) [Oct. 27, 2003 18:24:00], pp. 1-24.

Mobasher, Bamshad, et al., "Creating Adaptive Web Sites Through Usage-Based Clustering of URLs," pp. 1-7.

Cooley, R., et al., "Web Mining: Information and Pattern Discovery on the World Wide Web," Department of Computer Science and Engineering, University of Minnesota, pp. 1-10.

Cooley, R., et al., "Data Preparation for Mining World Wide Web Browsing Patterns," Department of Computer Science and Engineering, University of Minnesota, pp. 1-26.

Mobasher, Bamshad, et al., "Web Mining: Pattern Discovery from World Wide Web Transactions," Department of Computer Science and Engineering, University of Minnesota, pp. 1-12, dated Mar. 8, 1997.

Wu, K. L., et al., "SpeedTracer: A Web usage mining and analysis tool," IBM Systems, Journal, vol. 37, No. 1, pp. 1-17, (1998).

Shardanand, Upendra, "Social Information Filtering for Music Recommendations," Submitted to the Department of Electrical Engineering and Computer Science on Sep. 1, 1994, in partial fulfillment of the requirements for the degrees of Bachelor of Science in Electrical Science and Engineering and Master of Engineering in Electrical Engineering and Computer Science, Massachusetts Institute of Technology, stamped Nov. 18, 1994 (Libraries Archives).

* cited by examiner

RECOMMENDATION SYSTEM

RELATED APPLICATIONS

This application is a continuation of U.S. patent application Ser. No. 09/850,263, filed May 7, 2001 now U.S. Pat. No. 7,113,917, which is a continuation of U.S. patent application Ser. No. 09/156,237, filed Sep. 18, 1998 (now U.S. Pat. No. 6,317,722).

FIELD OF THE INVENTION

The present invention relates to information filtering and recommendation systems. More specifically, the invention relates to methods for predicting the interests of individual users based on the known interests of a community of users.

BACKGROUND OF THE INVENTION

A recommendation service is a computer-implemented service that recommends items from a database of items. The recommendations are customized to particular users based on information known about the users. One common application for recommendation services involves recommending products to online customers. For example, online merchants commonly provide services for recommending products (books, compact discs, videos, etc.) to customers based on profiles that have been developed for such customers. Recommendation services are also common for recommending Web sites, articles, and other types of informational content to users.

One technique commonly used by recommendation services is known as content-based filtering. Pure content-based systems operate by attempting to identify items which, based on an analysis of item content, are similar to items that are known to be of interest to the user. For example, a content-based Web site recommendation service may operate by parsing the user's favorite Web pages to generate a profile of commonly-occurring terms, and then use this profile to search for other Web pages that include some or all of these terms.

Content-based systems have several significant limitations. For example, content-based methods generally do not provide any mechanism for evaluating the quality or popularity of an item. In addition, content-based methods generally require that the items include some form of content that is amenable to feature extraction algorithms; as a result, content-based systems tend to be poorly suited for recommending movies, music titles, authors, restaurants, and other types of items that have little or no useful, parsable content.

Another common recommendation technique is known as collaborative filtering. In a pure collaborative system, items are recommended to users based on the interests of a community of users, without any analysis of item content. Collaborative systems commonly operate by having the users rate individual items from a list of popular items. Through this process, each user builds a personal profile of ratings data. To generate recommendations for a particular user, the user's profile is initially compared to the profiles of other users to identify one or more "similar users." Items that were rated highly by these similar users (but which have not yet been rated by the user) are then recommended to the user. An important benefit of collaborative filtering is that it overcomes the above-noted deficiencies of content-based filtering.

As with content-based filtering methods, however, existing collaborative filtering techniques have several problems. One problem is that the user is commonly faced with the onerous task of having to rate items in the database to build up a personal ratings profile. This task can be frustrating, particularly if the user is not familiar with many of the items that are presented for rating purposes. Further, because collaborative filtering relies on the existence of other, similar users, collaborative systems tend to be poorly suited for providing recommendations to users that have unusual tastes.

Another problem with collaborative filtering techniques is that an item in the database normally cannot be recommended until the item has been rated. As a result, the operator of a new collaborative recommendation system is commonly faced with a "cold start" problem in which the service cannot be brought online in a useful form until a threshold quantity of ratings data has been collected. In addition, even after the service has been brought online, it may take months or years before a significant quantity of the database items can be recommended.

Another problem with collaborative filtering methods is that the task of comparing user profiles tends to be time consuming—particularly if the number of users is large (e.g., tens or hundreds of thousands). As a result, a tradeoff tends to exist between response time and breadth of analysis. For example, in a recommendation system that generates real-time recommendations in response to requests from users, it may not be feasible to compare the user's ratings profile to those of all other users. A relatively shallow analysis of the available data (leading to poor recommendations) may therefore be performed.

Another problem with both collaborative and content-based systems is that they generally do not reflect the current preferences of the community of users. In the context of a system that recommends products to customers, for example, there is typically no mechanism for favoring items that are currently "hot sellers." In addition, existing systems do not provide a mechanism for recognizing that the user may be searching for a particular type or category of item.

SUMMARY OF THE DISCLOSURE

The present invention addresses these and other problems by providing a computer-implemented service and associated methods for generating personalized recommendations of items based on the collective interests of a community of users. An important benefit of the service is that the recommendations are generated without the need for the user, or any other users, to rate items. Another important benefit is that the recommended items are identified using a previously-generated table or other mapping structure which maps individual items to lists of "similar" items. The item similarities reflected by the table are based at least upon correlations between the interests of users in particular items.

The types of items that can be recommended by the service include, without limitation, books, compact discs ("CDs"), videos, authors, artists, item categories, Web sites, and chat groups. The service may be implemented, for example, as part of a Web site, online services network, e-mail notification service, document filtering system, or other type of computer system that explicitly or implicitly recommends items to users. In a preferred embodiment described herein, the service is used to recommend works such as book titles and music titles to users of an online merchant's Web site.

In accordance with one aspect of the invention, the mappings of items to similar items ("item-to-item mappings") are generated periodically, such as once per week, by an off-line process which identifies correlations between known interests of users in particular items. For example, in the embodiment described in detail below, the mappings are generating by periodically analyzing user purchase histories to identify correlations between purchases of items. The similarity between two items is preferably measured by determining the number of users that have an interest in both items relative to the number of users that have an interest in either item (e.g., items A and B are highly similar because a relatively large portion of the users that bought one of the items also bought the other item). The item-to-item mappings could also incorporate other types of similarities, including content-based similarities extracted by analyzing item descriptions or content.

To generate a set of recommendations for a given user, the service retrieves from the table the similar items lists corresponding to items already known to be of interest to the user, and then appropriately combines these lists to generate a list of recommended items. For example, if there are three items that are known to be of interest to the user (such as three items the user recently purchased), the service may retrieve the similar items lists for these three items from the table and combine these lists. Because the item-to-item mappings are regenerated periodically based on up-to-date sales data, the recommendations tend to reflect the current buying trends of the community.

In accordance with another aspect of the invention, the similar items lists read from the table may be appropriately weighted (prior to being combined) based on indicia of the user's affinity for, or current interest in, the corresponding items of known interest. For example, the similar items list for a book that was purchased in the last week may be weighted more heavily than the similar items list for a book that was purchased four months ago. Weighting a similar items list heavily has the effect of increasing the likelihood that the items in that list will be included in the recommendations that are ultimately presented to the user.

An important aspect of the service is that the relatively computation-intensive task of correlating item interests is performed off-line, and the results of this task (item-to-item mappings) stored in a mapping structure for subsequent lookup. This enables the personal recommendations to be generated rapidly and efficiently (such as in real-time in response to a request by the user), without sacrificing breadth of analysis.

Another feature of the invention involves using the current and/or recent contents of the user's shopping cart as inputs to the recommendation service (or to another type of recommendation service which generates recommendations given a unary listing of items). For example, if the user currently has three items in his or her shopping cart, these three items can be treated as the items of known interest for purposes of generating recommendations, in which case the recommendations may be generated and displayed automatically when the user views the shopping cart contents. Using the current and/or recent shopping cart contents as inputs tends to produce recommendations that are highly correlated to the current short-term interests of the user—even if these short term interest differ significantly from the user's general preferences. For example, if the user is currently searching for books on a particular topic and has added several such books to the shopping cart, this method will more likely produce other books that involve the same or similar topics.

Another feature of the invention involves allowing the user to create multiple shopping carts under a single account (such as shopping carts for different family members), and generating recommendations that are specific to a particular shopping cart. For example, the user can be prompted to select a particular shopping cart (or set of shopping carts), and the recommendations can then be generated based on the items that were purchased from or otherwise placed into the designated shopping cart(s). This feature of the invention allows users to obtain recommendations that correspond to the role or purpose (e.g., work versus pleasure) of a particular shopping cart.

Two specific implementations of the service are disclosed, both of which generate personal recommendations using the same type of table. In the first implementation, the recommendations are based on the items that have recently been rated or purchased by the user. In the second implementation, the recommendations are based on the current shopping cart contents of the user.

BRIEF DESCRIPTION OF THE DRAWINGS

These and other features of the invention will now be described with reference to the drawings summarized below. These drawings and the associated description are provided to illustrate a preferred embodiment of the invention, and not to limit the scope of the invention.

DETAILED DESCRIPTION OF PREFERRED EMBODIMENTS

Figure 1:
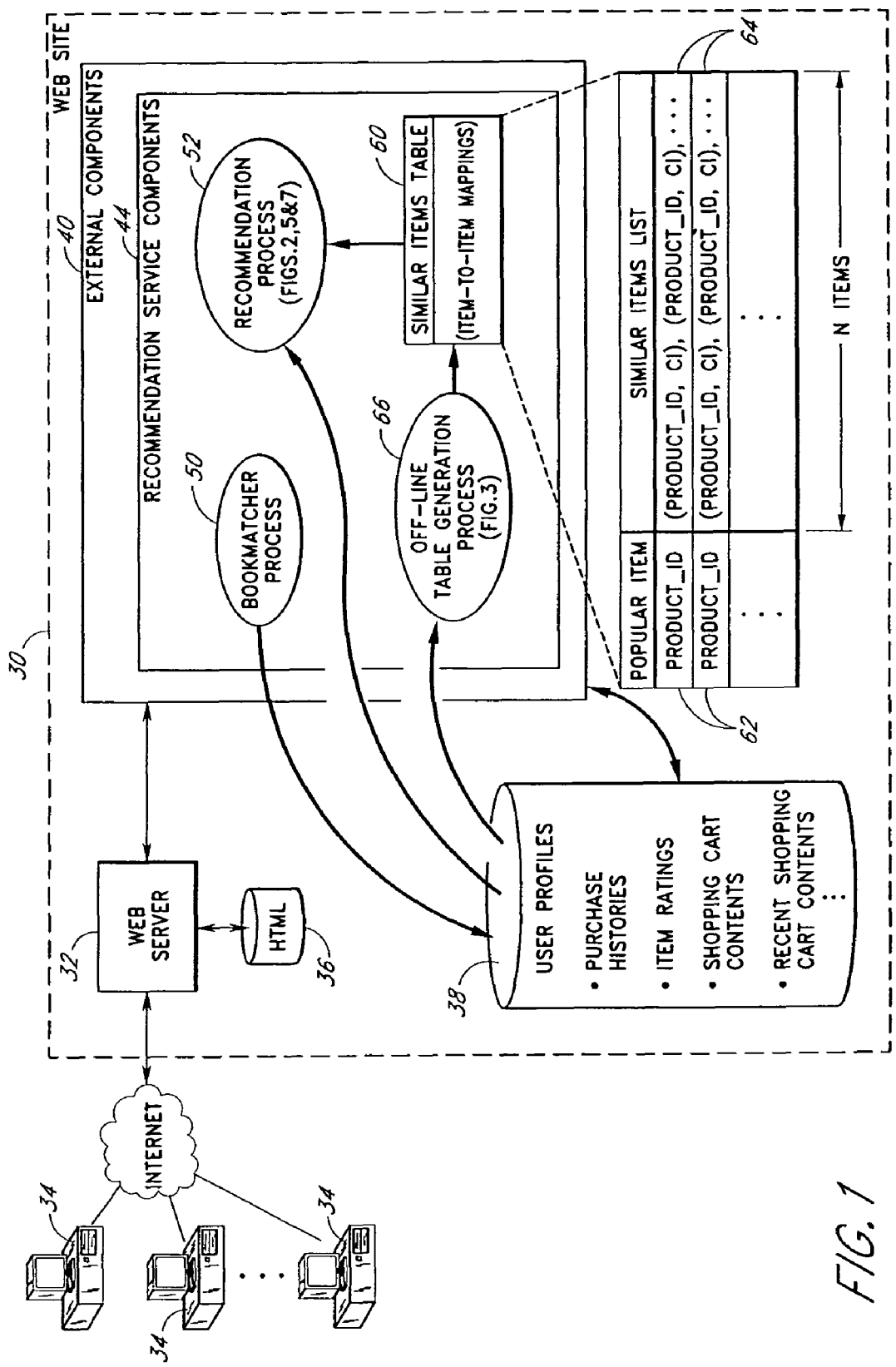
FIG. 1 illustrates a Web site which implements a recommendation service which operates in accordance with the invention, and illustrates the flow of information between components.

The various features and methods of the invention will now be described in the context of a recommendation service, including two specific implementations thereof, that is used to recommend book titles, music titles, video titles, and other types of items to individual users of the Amazon.com Web site. As will be recognized to those skilled in the art, the disclosed methods can also be used to recommend other types of items, including non-physical items. By way of example and not limitation, the disclosed methods can also be used to recommend authors, artists, categories or groups of titles, Web sites, chat groups, movies, television shows, downloadable content, restaurants, and other users.

Throughout the description, reference will be made to various implementation-specific details of the recommendation service, the Amazon.com Web site, and other recommendation services of the Web site. These details are provided in order to fully illustrate preferred embodiments of the invention, and not to limit the scope of the invention. The scope of the invention is set forth in the appended claims.

I. Overview of Web Site and Recommendation Services

The Amazon.com Web site includes functionality for allowing users to search, browse, and make purchases from an online catalog of several million book titles, music titles, video titles, and other types of items. Using a shopping cart feature of the site, users can add and remove items to/from a personal shopping cart which is persistent over multiple sessions. (As used herein, a "shopping cart" is a data structure and associated code which keeps track of items that have been selected by a user for possible purchase.) For example, a user can modify the contents of the shopping cart over a period of time, such as one week, and then proceed to a check out area of the site to purchase the shopping cart contents.

The user can also create multiple shopping carts within a single account. For example, a user can set up separate shopping carts for work and home, or can set up separate shopping carts for each member of the user's family. A preferred shopping cart scheme for allowing users to set up and use multiple shopping carts is disclosed in U.S. application Ser. No. 09/104,942, filed Jun. 25, 1998, titled METHOD AND SYSTEM FOR ELECTRONIC COMMERCE USING MULTIPLE ROLES, the disclosure of which is hereby incorporated by reference.

The site also implements a variety of different recommendation services for recommending book titles, music titles, and/or video titles to users. One such service, known as BookMatcher™, allows users to interactively rate individual books on a scale of 1-5 to create personal item ratings profiles, and applies collaborative filtering techniques to these profiles to generate personal recommendations. The BookMatcher service is described in detail in U.S. application Ser. No. 09/040, 171 filed Mar. 17, 1998, the disclosure of which is hereby incorporated by reference. The site may also include associated services that allow users to rate other types of items, such as CDs and videos. As described below, the ratings data collected by the BookMatcher service and similar services is optionally incorporated into the recommendation processes of the present invention.

Another type of service is a recommendation service which operates in accordance with the invention. The service ("Recommendation Service") is preferably used to recommend book titles, music titles and/or videos titles to users, but could also be used in the context of the same Web site to recommend other types of items, including authors, artists, and groups or categories of titles. Briefly, given a unary listing of items that are "known" to be of interest to a user (e.g., a list of items purchased, rated, and/or viewed by the user), the Recommendation Service generates a list of additional items ("recommendations") that are predicted to be of interest to the user. (As used herein, the term "interest" refers generally to a user's liking of or affinity for an item; the term "known" is used to distinguish items for which the user has implicitly or explicitly indicated some level of interest from items predicted by the Recommendation Service to be of interest.)

The recommendations are generated using a table which maps items to lists of "similar" items ("similar items lists"), without the need for users to rate any items (although ratings data may optionally be used). For example, if there are three items that are known to be of interest to a particular user (such as three items the user recently purchased), the service may retrieve the similar items lists for these three items from the table, and appropriately combine these lists (as described below) to generate the recommendations.

In accordance with one aspect of the invention, the mappings of items to similar items ("item-to-item mappings") are generated periodically, such as once per week, from data which reflects the collective interests of the community of users. More specifically, the item-to-item mappings are generated by an off-line process which identifies correlations between known interests of users in particular items. For example, in the embodiment described in detail below, the mappings are generating by analyzing user purchase histories to identify correlations between purchases of particular items (e.g., items A and B are similar because a relatively large portion of the users that purchased item A also bought item B). The item-to-item mappings could also reflect other types of similarities, including content-based similarities extracted by analyzing item descriptions or content.

An important aspect of the Recommendation Service is that the relatively computation-intensive task of correlating item interests is performed off-line, and the results of this task (item-to-item mappings) are stored in a mapping structure for subsequent look-up. This enables the personal recommendations to be generated rapidly and efficiently (such as in real-time in response to a request by the user), without sacrificing breadth of analysis.

In accordance with another aspect of the invention, the similar items lists read from the table are appropriately weighted (prior to being combined) based on indicia of the user's affinity for or current interest in the corresponding items of known interest. For example, in one embodiment described below, if the item of known interest was previously rated by the user (such as through use of the BookMatcher service), the rating is used to weight the corresponding similar items list. Similarly, the similar items list for a book that was purchased in the last week may be weighted more heavily than the similar items list for a book that was purchased four months ago.

Another feature of the invention involves using the current and/or recent contents of the user's shopping cart as inputs to the Recommendation Service. For example, if the user currently has three items in his or her shopping cart, these three items can be treated as the items of known interest for purposes of generating recommendations, in which case the recommendations may be generated and displayed automatically when the user views the shopping cart contents. If the user has multiple shopping carts, the recommendations are preferably generated based on the contents of the shopping cart implicitly or explicitly designated by the user, such as the shopping cart currently being viewed. This method of generating recommendations can also be used within other types of recommendation systems, including content-based systems and systems that do not use item-to-item mappings.

Using the current and/or recent shopping cart contents as inputs tends to produce recommendations that are highly correlated to the current short-term interests of the user—even if these short term interests are not reflected by the user's purchase history. For example, if the user is currently searching for a father's day gift and has selected several books for prospective purchase, this method will have a tendency to identify other books that are well suited for the gift recipient.

Another feature of the invention involves generating recommendations that are specific to a particular shopping cart. This allows a user who has created multiple shopping carts to conveniently obtain recommendations that are specific to the role or purpose to the particular cart. For example, a user who has created a personal shopping cart for buying books for her children can designate this shopping cart to obtain recommendations of children's books. In one embodiment of this feature, the recommendations are generated based solely upon the current contents of the shopping cart selected for display. In another embodiment, the user may designate one or more shopping carts to be used to generate the recommendations, and the service then uses the items that were purchased from these shopping carts as the items of known interest.

As will be recognized by those skilled in the art, the above-described techniques for using shopping cart contents to generate recommendations can also be incorporated into other types of recommendation systems, including pure content-based systems.

FIG. 1 illustrates the basic components of the Amazon.com Web site 30, including the components used to implement the Recommendation Service. The arrows in FIG. 1 show the general flow of information that is used by the Recommendation Service. As illustrated by FIG. 1, the Web site 30 includes a Web server application 32 ("Web server") which processes HTTP (Hypertext Transfer Protocol) requests received over the Internet from user computers 34. The Web server 34 accesses a database 36 of HTML (Hypertext Markup Language) content which includes product information pages and other browsable information about the various products of the catalog. The "items" that are the subject of the Recommendation Service are the titles (regardless of media format such as hardcover or paperback) that are represented within this database 36.

The Web site 30 also includes a "user profiles" database 38 which stores account-specific information about users of the site. Because a group of individuals can share an account, a given "user" from the perspective of the Web site may include multiple actual users. As illustrated by FIG. 1, the data stored for each user may include one or more of the following types of information (among other things) that can be used to generate recommendations in accordance with the invention: (a) the user's purchase history, including dates of purchase, (b) the user's item ratings profile (if any), (c) the current contents of the user's personal shopping cart(s), and (d) a listing of items that were recently (e.g., within the last six months) removed from the shopping cart(s) without being purchased ("recent shopping cart contents"). If a given user has multiple shopping carts, the purchase history for that user may include information about the particular shopping cart used to make each purchase; preserving such information allows the Recommendation Service to be configured to generate recommendations that are specific to a particular shopping cart.

As depicted by FIG. 1, the Web server 32 communicates with various external components 40 of the site. These external components 40 include, for example, a search engine and associated database (not shown) for enabling users to interactively search the catalog for particular items. Also included within the external components 40 are various order processing modules (not shown) for accepting and processing orders, and for updating the purchase histories of the users.

The external components 40 also include a shopping cart process (not shown) which adds and removes items from the users' personal shopping carts based on the actions of the respective users. (The term "process" is used herein to refer generally to one or more code modules that are executed by a computer system to perform a particular task or set of related tasks.) In one embodiment, the shopping cart process periodically "prunes" the personal shopping cart listings of items that are deemed to be dormant, such as items that have not been purchased or viewed by the particular user for a predetermined period of time (e.g. two weeks). The shopping cart process also preferably generates and maintains the user-specific listings of recent shopping cart contents.

The external components 40 also include recommendation service components 44 that are used to implement the site's various recommendation services. Recommendations generated by the recommendation services are returned to the Web server 32, which incorporates the recommendations into personalized Web pages transmitted to users.

The recommendation service components 44 include a BookMatcher application 50 which implements the above-described BookMatcher service. Users of the BookMatcher service are provided the opportunity to rate individual book titles from a list of popular titles. The book titles are rated according to the following scale:

1=Bad!
2=Not for me
3=OK
4=Liked it
5=Loved it!

Users can also rate book titles during ordinary browsing of the site. As depicted in FIG. 1, the BookMatcher application 50 records the ratings within the user's items rating profile. For example, if a user of the BookMatcher service gives the book *Into Thin Air* a score of "5," the BookMatcher application 50 would record the item (by ISBN or other identifier) and the score within the user's item ratings profile. The BookMatcher application 50 uses the users' item ratings profiles to generate personal recommendations, which can be requested by the user by selecting an appropriate hyperlink. As described in detail below, the item ratings profiles are also used by an "Instant Recommendations" implementation of the Recommendation Service.

The recommendation services components 44 also include a recommendation process 52, a similar items table 60, and an off-line table generation process 66, which collectively implement the Recommendation Service. As depicted by the arrows in FIG. 1, the recommendation process 52 generates personal recommendations based on information stored within the similar items table 60, and based on the items that are known to be of interest ("items of known interest") to the particular user.

In the embodiments described in detail below, the items of known interest are identified based on information stored in the user's profile, such as by selecting all items purchased by the user or all items in the user's shopping cart. In other embodiments of the invention, other types of methods or sources of information could be used to identify the items of known interest. For example, in a service used to recommend Web sites, the items (Web sites) known to be of interest to a user could be identified by parsing a Web server access log and/or by extracting URLs from the "favorite places" list of the user's Web browser. In a service used to recommend restaurants, the items (restaurants) of known interest could be identified by parsing the user's credit card records to identify restaurants that were visited more than once.

The various processes 50, 52, 66 of the recommendation services may run, for example, on one or more Unix or NT based workstations or physical servers (not shown) of the Web site 30. The similar items table 60 is preferably stored as a B-tree data structure to permit efficient look-up, and may be replicated across multiple machines (together with the associated code of the recommendation process 52) to accommodate heavy loads.

II. Similar Items Table (FIG. 1)

The general form and content of the similar items table 60 will now be described with reference to FIG. 1. As this table can take on many alternative forms, the details of the table are intended to illustrate, and not limit, the scope of the invention.

As indicated above, the similar items table 60 maps items to lists of similar items based at least upon the collective interests of the community of users. The similar items table 60 is preferably generated periodically (e.g., once per week) by the off-line table generation process 66. The table generation process 66 generates the table 60 from data that reflects the collective interests of the community of users. In the embodiment described in detail herein, the similar items table is generated exclusively from the purchase histories of the community of users (as depicted in FIG. 1). In other embodiments, the table 60 may additionally or alternatively be generated from other indicia of user-item interests, including indicia based on users viewing activities, shopping cart activities, and item rating profiles. For example, the table 60 could be built exclusively from the present and/or recent shopping cart contents of users. The similar items table 60 could also reflect non-collaborative type item similarities, including content-based similarities derived by comparing item contents or descriptions.

Each entry in the similar items table 60 is preferably in the form of a mapping of a popular item 62 to a corresponding list 64 of similar items ("similar items lists"). As used herein, a "popular" item is an item which satisfies some pre-specified popularity criteria. For example, in the embodiment described herein, an item is treated as popular of it has been purchased by more than 30 customers during the life of the Web site. Using this criteria produces a set of popular items (and thus a recommendation service) which grows over time. The similar items list 64 for a given popular item 62 may include other popular items.

In other embodiments involving sales of products, the table 60 may include entries for most or all of the products of the online merchant, rather than just the popular items. In the embodiment described herein, several different types of items (books, CDs, videos, etc.) are reflected within the same table 60, although separate tables could alternatively be generated for each type of item.

Each similar items list 64 consists of the N (e.g., 20) items which, based on correlations between purchases of items, are deemed to be the most closely related to the respective popular item 62. Each item in the similar items list 64 is stored together with a commonality index ("CI") value which indicates the relatedness of that item to the popular item 62, based on sales of the respective items. A relatively high commonality index for a pair of items ITEM A and ITEM B indicates that a relatively large percentage of users who bought ITEM A also bought ITEM B (and vice versa). A relatively low commonality index for ITEM A and ITEM B indicates that a relatively small percentage of the users who bought ITEM A also bought ITEM B (and vice versa). As described below, the similar items lists are generated, for each popular item, by selecting the N other items that have the highest commonality index values. Using this method, ITEM A may be included in ITEM B's similar items list even though ITEM B in not present in ITEM A's similar items list.

In the embodiment depicted by FIG. 1, the items are represented within the similar items table 60 using product IDs, such as ISBNs or other identifiers. Alternatively, the items could be represented within the table by title ID, where each title ID corresponds to a given "work" regardless of its media format. In either case, different items which correspond to the same work, such as the hardcover and paperback versions of a given book or the VCR cassette and DVD versions of a given video, are preferably treated as a unit for purposes of generating recommendations.

Although the recommendable items in the described system are in the form of book titles, music titles and videos titles, it will be appreciated that the underlying methods and data structures can be used to recommend a wide range of other types of items. For example, in the system depicted by FIG. 1, the Recommendation Service could also be used to recommend authors, artists, and categorizations or groups of works.

III. General Process for Generating Recommendations (FIG. 2)

The general sequence of steps that are performed by the recommendation process 52 to generate a set of personal recommendations will now be described with reference to FIG. 2. This process, and the more specific implementations of the process depicted by FIGS. 5 and 7 (described below), are intended to illustrate, and not limit, the scope of the invention.

Figure 2:
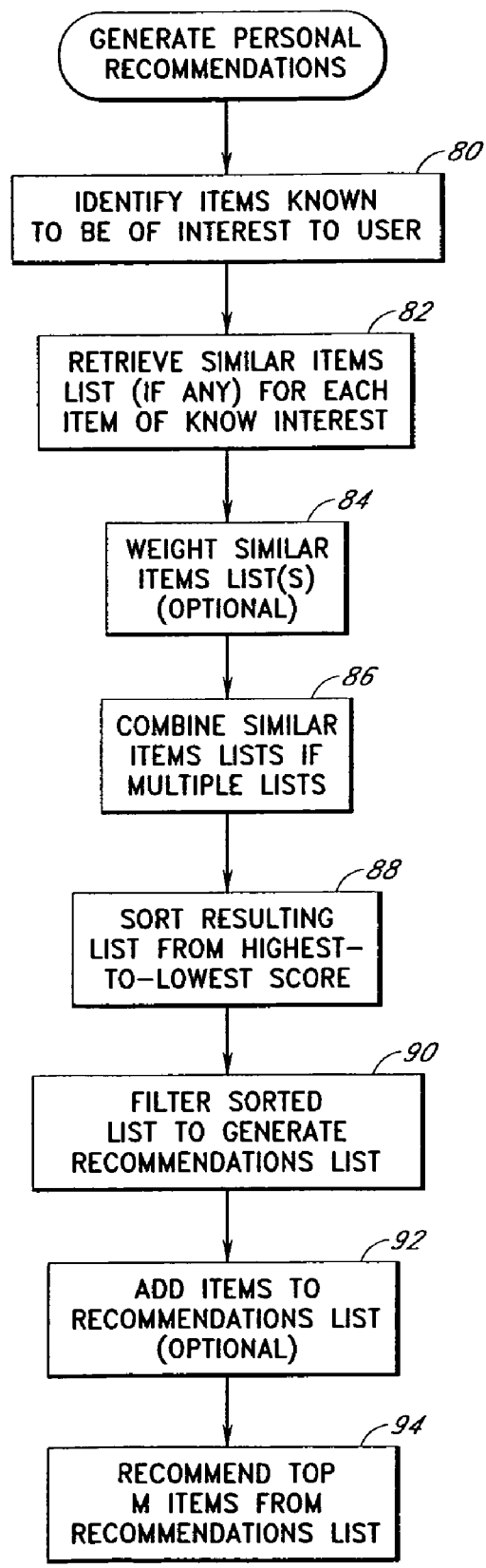
FIG. 2 illustrates a sequence of steps that are performed by the recommendation process of FIG. 1 to generate personalized recommendations.

The FIG. 2 process is preferably invoked in real-time in response to an online action of the user. For example, in an Instant Recommendations implementation (FIGS. 5 and 6) of the service, the recommendations are generated and displayed in real-time (based on the user's purchase history and/or item ratings profile) in response to selection by the user of a corresponding hyperlink, such as a hyperlink which reads "Instant Book Recommendations" or "Instant Music Recommendations." In a shopping cart based implementation (FIG. 7), the recommendations are generated (based on the user's current and/or recent shopping cart contents) in real-time when the user initiates a display of a shopping cart, and are displayed on the same Web page as the shopping cart contents. The Instant Recommendations and shopping cart based embodiments are described separately below under corresponding headings.

Any of a variety of other methods can be used to initiate the recommendations generation process and to display the recommendations to the user. For example, the recommendations can automatically be generated periodically and sent to the user by e-mail, in which case the e-mail listing may contain hyperlinks to the product information pages of the recommended items. Further, the personal recommendations could be generated in advance of any request or action by the user, and cached by the Web site 30 until requested.

As illustrated by FIG. 2, the first step (step 80) of the recommendations-generation process involves identifying a set of items that are of known interest to the user. The "knowledge" of the user's interest can be based on explicit indications of interest (e.g., the user rated the item highly) or implicit indications of interest (e.g., the user added the item to a shopping cart). Items that are not "popular items" within the similar items table 60 can optionally be ignored during this step.

In the embodiment depicted in FIG. 1, the items of known interest are selected from one or more of the following groups: (a) items in the user's purchase history (optionally limited to those items purchased from a particular shopping cart); (b) items in the user's shopping cart (or a particular shopping cart designated by the user), (c) items rated by the user (optionally with a score that exceeds a certain threshold, such as two), and (d) items in the "recent shopping cart contents" list associated with a given user or shopping cart. In other embodiments, the items of known interest may additionally or alternatively be selected based on the viewing activities of the user. For example, the recommendations process 52 could select items that were viewed by the user for an extended period of time and/or viewed more than once. Further, the user could be prompted to select items of interest from a list of popular items.

For each item of known interest, the service retrieves the corresponding similar items list 64 from the similar items table 60 (step 82), if such a list exists. If no entries exist in the table 60 for any of the items of known interest, the process 52 may be terminated; alternatively, the process could attempt to identify additional items of interest, such as by accessing other sources of interest information.

In step 84, the similar items lists 64 are optionally weighted based on information about the user's affinity for the corresponding items of known interest. For example, a similar items list 64 may be weighted heavily if the user gave the corresponding popular item a rating of "5" on a scale or 1-5, or if the user purchased multiple copies of the item. Weighting a similar items list 64 heavily has the effect of increasing the likelihood that the items in that list we be included in the recommendations that are ultimately presented to the user. In one implementation described below, the user is presumed to have a greater affinity for recently purchased items over earlier purchased items.

The similar items lists 64 are preferably weighted by multiplying the commonality index values of the list by a weighting value. The commonality index values as weighted by any applicable weighting value are referred to herein as "scores." In other embodiments, the recommendations may be generated without weighting the similar items lists 64.

If multiple similar items lists 64 are retrieved in step 82, the lists are appropriately combined (step 86), such as by merging the lists while summing the scores of like items. The resulting list is then sorted (step 88) in order of highest-to-lowest score. In step 90, the sorted list is filtered to remove unwanted items. The items removed during the filtering process may include, for example, items that have already been purchased or rated by the user, and items that fall outside any product group (such as music or books), product category (such as nonfiction), or content rating (such as PG or adult) designated by the user. The filtering step could alternatively be performed at a different stage of the process, such as during the retrieval of the similar items lists from the table 60. The result of step 90 is a list ("recommendations list") of other items to be recommended to the user.

In step 92, one or more additional items are optionally added to the recommendations list. In one embodiment, the items added in step 92 are selected from the set of items (if any) in the user's "recent shopping cart contents" list. As an important benefit of this step, the recommendations include one or more items that the user previously considered purchasing but did not purchase. The items added in step 92 may additionally or alternatively be selected using another recommendations method, such as a content-based method.

Finally, in step 94, a list of the top M (e.g., 15) items of the recommendations list are returned to the Web server 32 (FIG. 1). The Web server incorporates this list into one or more Web pages that are returned to the user, with each recommended item being presented as a hypertextual link to the item's product information page. The recommendations may alternatively be conveyed to the user by email, facsimile, or other transmission method. Further, the recommendations could be presented as advertisements for the recommended items.

IV. Generation of Similar Items Table (FIGS. 3 and 4)

The table-generation process 66 is preferably executed periodically (e.g., once a week) to generate a similar items table 60 that reflects the most recent purchase history data. The recommendation process 52 uses the most recently generated version of the table 60 to generate recommendations.

Figure 3:
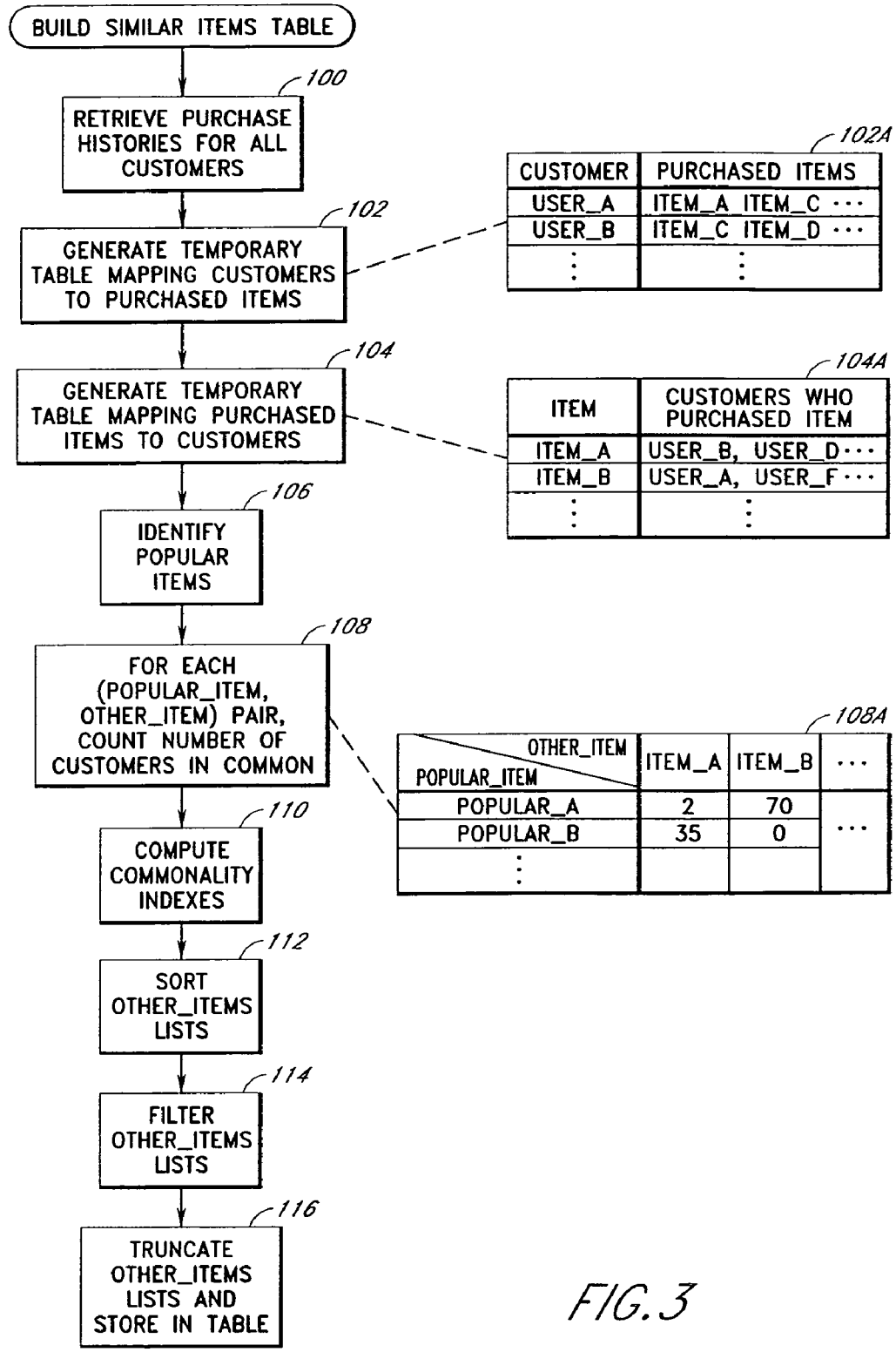
FIG. 3 illustrates a sequence of steps that are performed by the table generation process of FIG. 1 to generate a similar items table, and illustrates temporary data structures generated during the process.
Figure 4:
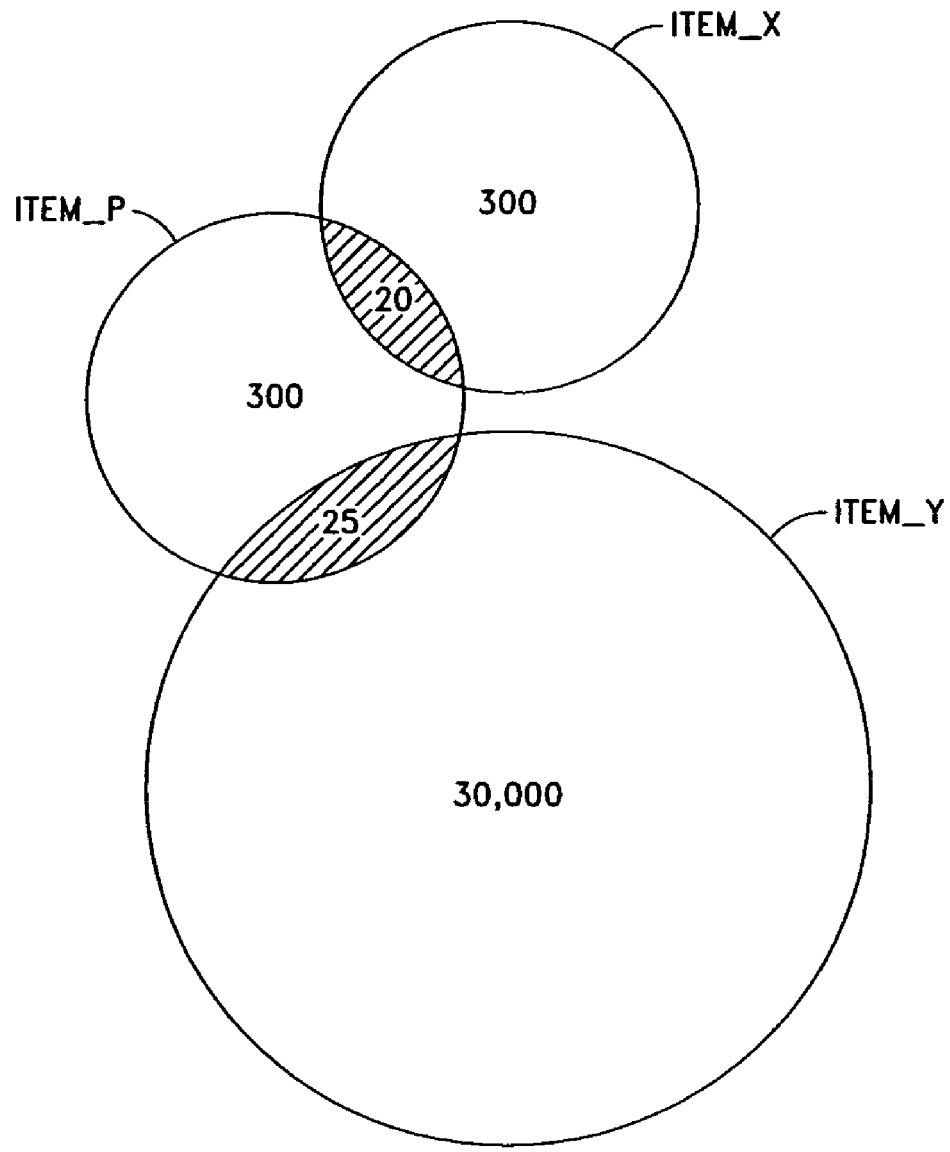
FIG. 4 is a Venn diagram illustrating a hypothetical purchase history profile of three items.

FIG. 3 illustrates the sequence of steps that are performed by the table generation process 66 to build the similar items table 60. The general form of temporary data structures that are generated during the process are shown at the right of the drawing. As will be appreciated by those skilled in the art, any of a variety of alternative methods could be used to generate the table 60.

As depicted by FIG. 3, the process initially retrieves the purchase histories for all customers (step 100). Each purchase history is in the general form of the user ID of a customer together with a list of the product IDs (ISBNs, etc.) of the items (books, CDs, videos, etc.) purchased by that customer. In embodiments which support multiple shopping carts within a given account, each shopping cart could be treated as a separate customer for purposes of generating the table. For example, if a given user (or group of users that share an account) purchased items from two different shopping carts within the same account, these purchases could be treated as the purchases of separate users.

The product IDs may be converted to title IDs during this process, or when the table 60 is later used to generate recommendations, so that different versions of an item (e.g., hardcover and paperback) are represented as a single item. This may be accomplished, for example, by using a separate database which maps product IDs to title IDs. To generate a similar items table that strongly reflects the current tastes of the community, the purchase histories retrieved in step 100 can be limited to a specific time period, such as the last six months.

In steps 102 and 104, the process generates two temporary tables 102A and 104A. The first table 102A maps individual customers to the items they purchased. The second table 104A maps items to the customers that purchased such items. To avoid the effects of "ballot stuffing," multiple copies of the same item purchased by a single customer are represented with a single table entry. For example, even if a single customer purchased 4000 copies of one book, the customer will be treated as having purchased only a single copy. In addition, items that were sold to an insignificant number (e.g., <15) of customers are preferably omitted or deleted from the tables 102A, 104B.

In step 106, the process identifies the items that constitute "popular" items. This may be accomplished, for example, by selecting from the item-to-customers table 104A those items that were purchased by more than a threshold number (e.g., 30) of customers. In the context of the Amazon.com Web site, to resulting set of popular items may contain hundreds of thousands or millions of items.

In step 108, the process counts, for each (popular_item, other_item) pair, the number of customers that are in common. A pseudocode sequence for performing this step is listed in Table 1. The result of step 108 is a table that indicates, for each (popular_item, other_item) pair, the number of customers the two have in common. For example, in the hypothetical table 108A of FIG. 3, POPULAR_A and ITEM_B have seventy customers in common, indicating that seventy customers bought both items.

TABLE 1

```
for each popular_item
    for each customer in customers of item
        for each other_item in items of customer
            increment common-customer-count(popular_item,
                other_item)
```

In step 110, the process generates the commonality indexes for each (popular_item, other_item) pair in the table 108A. As indicated above, the commonality index (CI) values are measures of the similarity between two items, with larger CI values indicating greater degrees of similarity. The commonality indexes are preferably generated such that, for a given popular_item, the respective commonality indexes of the corresponding other_items take into consideration both (a) the number of customers that are common to both items, and (b) the total number of customers of the other_item. A preferred method for generating the commonality index values is set forth in the equation below, in which $N_A$ represents the number of customers of item_A, $N_B$ represents the number of customers of item_B, and $N_{common}$ represents the number of customers of item_A and item_B.

$$CI(\text{item\_A, item\_B}) = \frac{N_{common}}{\sqrt{N_A \times N_B}}$$

FIG. 4 illustrates this method in example form. In the FIG. 4 example, item_P (a popular item) has two "other items," item_X and item_Y. Item_P has been purchased by 300 customers, item_X by 300 customers, and item_Y by 30,000 customers. In addition, item_P and item_X have 20 customers in common, and item_P and item_Y have 25 customers in common. Applying the equation above to the values shown in FIG. 4 produces the following results:

$$CI(\text{item\_P, item\_X}) = 20/\text{sqrt}(300 \times 300)) = 0.0667$$

$$CI(\text{item\_P, item\_Y}) = 25/\text{sqrt}(300 \times 30{,}000)) = 0.0083$$

Thus, even though items P and Y have more customers in common than items P and X, items P and X are treated as being more similar than items P and Y. This result desirably reflects the fact that the percentage of item_X customers that bought item_P (6.7%) is much greater than the percentage of item_Y customers that bought item_P (0.08%).

Because this equation is symmetrical (i.e., CI(item_A, item_B)=CI(item_B, item_A)), it is not necessary to separately calculate the CI value for every location in the table 108A. In other embodiments, an asymmetrical method may be used to generate the CI values. For example, the CI value for a (popular_item, other_item) pair could be generated as (customers of popular_item and other_item)/(customers of other_item).

Following step 110 of FIG. 3, each popular item has a respective "other_items" list which includes all of the other_items from the table 108A and their associated CI values. In step 112, each other_items list is sorted from highest-to-lowest commonality index. Using the FIG. 4 values as an example, item_X would be positioned closer to the top of the item_B's list than item_Y, since 0.014907>0.001643.

In step 114, the sorted other_items lists are filtered by deleting all list entries that have fewer than 3 customers in common. For example, in the other_items list for POPULAR_A in table 108A, ITEM_A would be deleted since POPULAR_A and ITEM_A have only two customers in common. Deleting such entries tends to reduce statistically poor correlations between item sales.

In step 116, the sorted other_items lists are truncated to length N to generate the similar items lists, and the similar items lists are stored in a B-tree table structure for efficient look-up As indicated above, any of a variety of other methods for evaluating similarities between items could be incorporated into the table generation process 66. For example, the table generation process could compare item contents and/or use previously-assigned product categorizations as additional indicators of item similarities. An important benefit of the FIG. 3 method, however, is that the items need not contain any content that is amenable to feature extraction techniques, and need not be pre-assigned to any categories. For example, the method can be used to generate a similar items table given nothing more than the product IDs of a set of products and user purchase histories with respect to these products.

Another important benefit of the Recommendation Service is that the bulk of the processing (the generation of the similar items table 60) is performed by an off-line process. Once this table has been generated, personalized recommendations can be generated rapidly and efficiently, without sacrificing breadth of analysis.

V. Instant Recommendations Service (FIGS. 5 and 6)

A specific implementation of the Recommendation Service, referred to herein as the Instant Recommendations service, will now be described with reference to FIGS. 5 and 6.

As indicated above, the Instant Recommendations service is invoked by the user by selecting a corresponding hyperlink from a Web page. For example, the user may select an "Instant Book Recommendations" or similar hyperlink to obtain a listing of recommended book titles, or may select a "Instant Music Recommendations" or "Instant Video Recommendations" hyperlink to obtain a listing of recommended music or video titles. As described below, the user can also request that the recommendations be limited to a particular item category, such as "non-fiction," "jazz" or "comedies." The Instant Recommendations service generates the recommendations based exclusively on the purchase history and any item ratings profile of the particular user. The service becomes available to the user (i.e., the appropriate hyperlink is presented to the user) once the user has purchased and/or rated a threshold number (e.g. three) of popular items within the corresponding product group. If the user has established multiple shopping carts, the user may also be presented the option of designating a particular shopping cart to be used in generating the recommendations.

Figure 5:
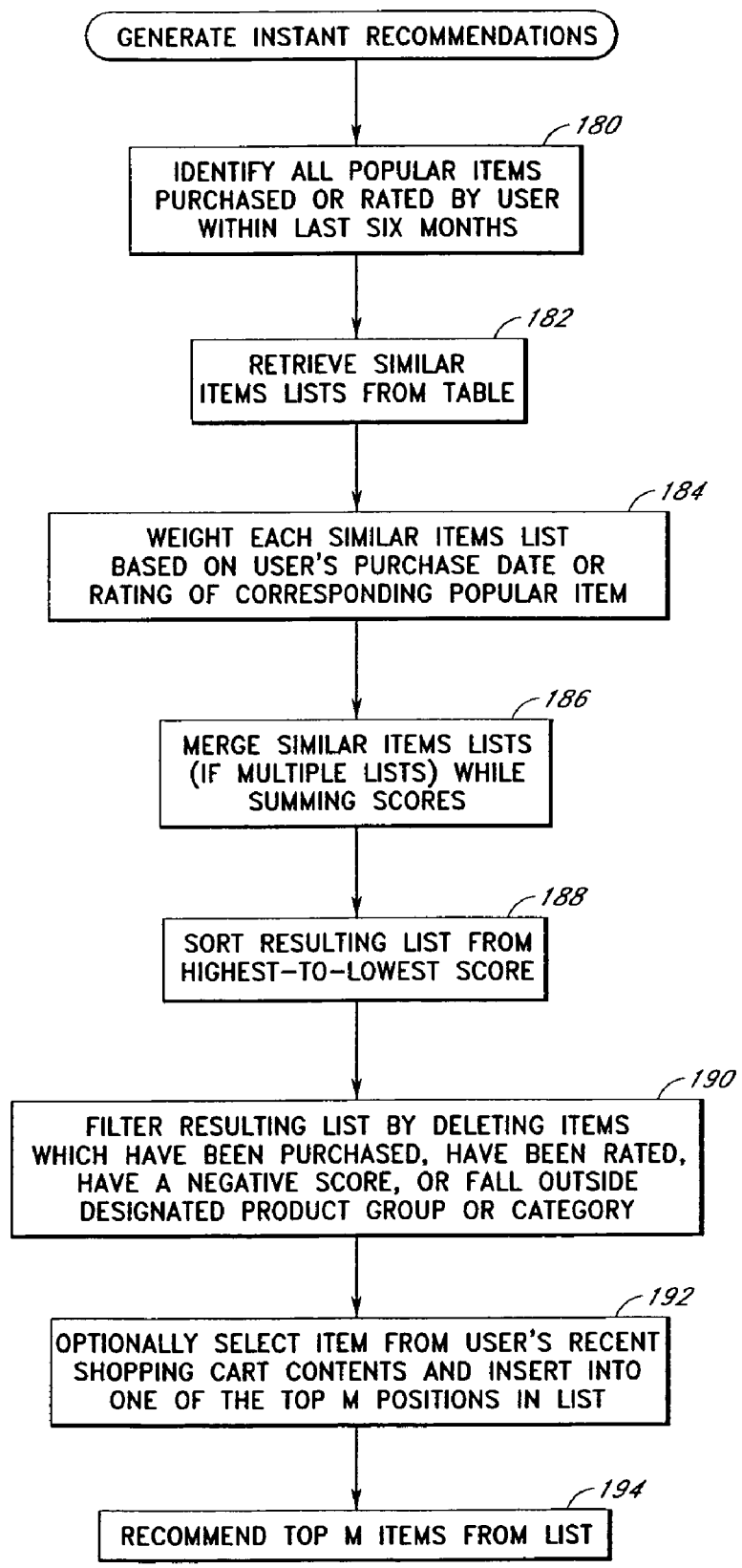
FIG. 5 illustrates one specific implementation of the sequence of steps of FIG. 2.
Figure 6:
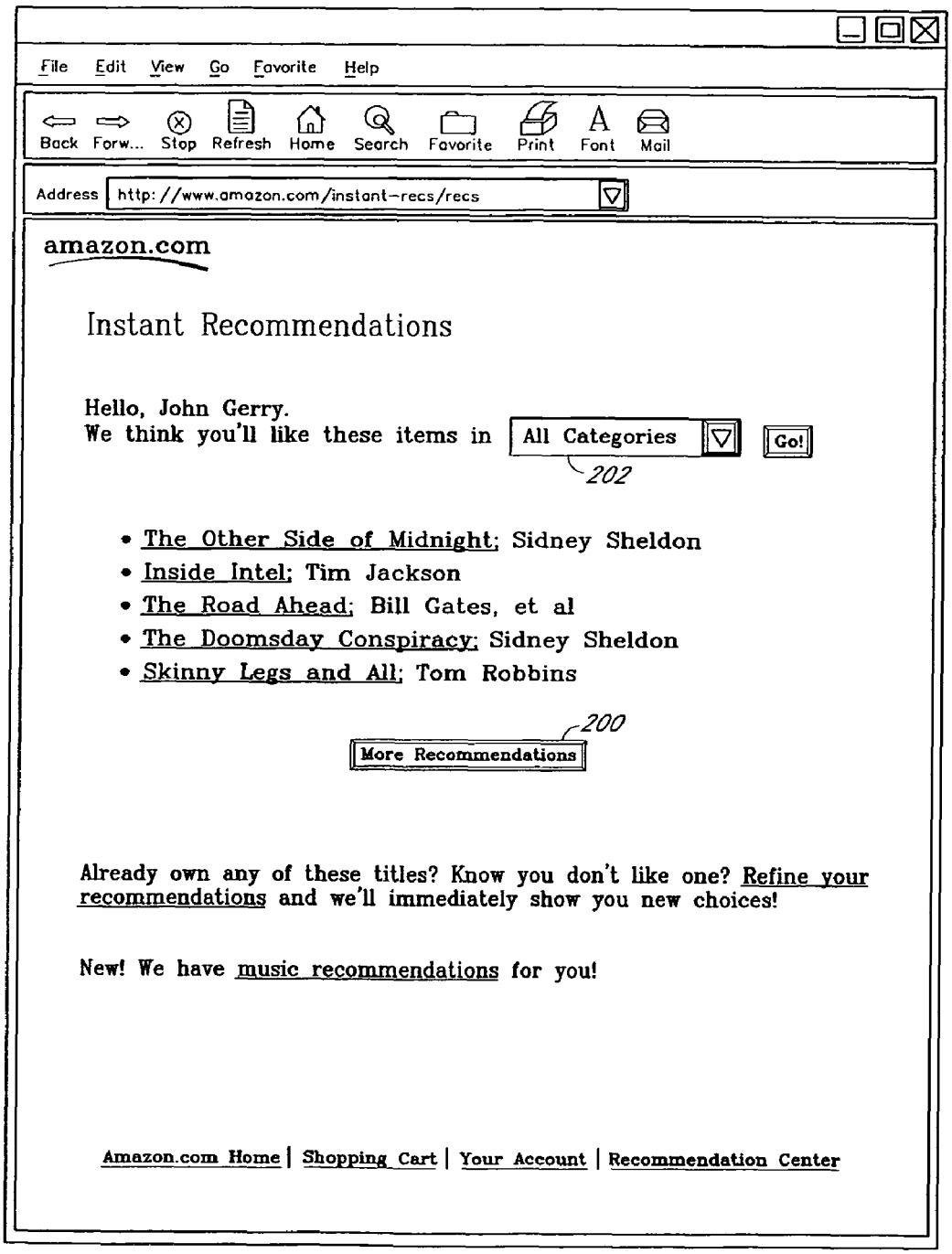
FIG. 6 illustrates the general form of a Web pages used to present the recommendations of the FIG. 5 process to the user.

FIG. 5 illustrates the sequence of steps that are performed by the Instant Recommendations service to generate personal recommendations. Steps 180-194 in FIG. 5 correspond, respectively, to steps 80-94 in FIG. 2. In step 180, the process 52 identifies all popular items that have been purchased by the user (from a particular shopping cart, if designated) or rated by the user, within the last six months. In step 182, the process retrieves the similar items lists 64 for these popular items from the similar items table 60.

In step 184, the process 52 weights each similar items list based on the duration since the associated popular item was purchased by the user (with recently-purchased items weighted more heavily), or if the popular item was not purchased, the rating given to the popular item by the user. The formula used to generate the weight values to apply to each similar items list is listed in C in Table 2. In this formula, "is_purchased" is a boolean variable which indicates whether the popular item was purchased, "rating" is the rating value (1-5), if any, assigned to the popular item by the user, "order_date" is the date/time (measured in seconds since 1970) the popular item was purchased, "now" is the current date/time (measured in seconds since 1970), and "6 months" is six months in seconds.

TABLE 2

| 1 | Weight = ( ( (is_purchased ? 5 : rating) * 2 − 5) * |
| 2 | ( 1 + (max( (is purchased ? order_date : 0) − |
|   | (now − 6 months), 0 ) ) |
| 3 | / (6 months)) |

In line 1 of the formula, if the popular item was purchased, the value "5" (the maximum possible rating value) is selected; otherwise, the user's rating of the item is selected. The selected value (which may range from 1-5) is then multiplied by 2, and 5 is subtracted from the result. The value calculated in line 1 thus ranges from a minimum of −3 (if the item was rated a "1") to a maximum of 5 (if the item was purchased or was rated a "5").

The value calculated in line 1 is multiplied by the value calculated in lines 2 and 3, which can range from a minimum of 1 (if the item was either not purchased or was purchased at least six months ago) to a maximum of 2 (if order_date=now).

Thus, the weight can range from a minimum of −6 to a maximum of 10. Weights of zero and below indicate that the user rated the item a "2" or below. Weights higher than 5 indicate that the user actually purchased the item (although a weight of 5 or less is possible even if the item was purchased), with higher values indicating more recent purchases.

The similar items lists 64 are weighted in step 184 by multiplying the CI values of the list by the corresponding weight value. For example, if the weight value for a given popular item is ten, and the similar items list 64 for the popular item is (productid_A,0.10),(productid_B,0.09),(productid_C, 0.08), the weighted similar items list would be:

(productid_A,1.0),(productid_B,0.9),(productid_C, 0.8),

The numerical values in the weighted similar items lists are referred to as "scores."

In step 186, the weighted similar items lists are merged (if multiple lists exist) to form a single list. During this step, the scores of like items are summed. For example, if a given other_item appears in three different similar items lists 64, the three scores (including any negative scores) are summed to produce a composite score.

In step 188, the resulting list is sorted from highest-to-lowest score. The effect of the sorting operation is to place the most relevant items at the top of the list. In step 190, the list is filtered by deleting any items that (1) have already been purchased or rated by the user, (2) have a negative score, or (3) do not fall within the designated product group (e.g., books) or category (e.g., "science fiction," or "jazz").

In step 192 one or more items are optionally selected from the recent shopping cart contents list (if such a list exists) for the user, excluding items that have been rated by the user or which fall outside the designated product group or category. The selected items, if any, are inserted at randomly-selected locations within the top M (e.g., 15) positions in the recommendations list. Finally, in step 194, the top M items from the recommendations list are returned to the Web server 32, which incorporates these recommendations into one or more Web pages.

The general form of such a Web page is shown in FIG. 6, which lists five recommended items. From this page, the user can select a link associated with one of the recommended items to view the product information page for that item. In addition, the user can select a "more recommendations" button 200 to view additional items from the list of M items. Further, the user can select a "refine your recommendations" link to rate or indicate ownership of the recommended items. Indicating ownership of an item causes the item to be added to the user's purchase history listing.

The user can also select a specific category such as "non-fiction" or "romance" from a drop-down menu 202 to request category-specific recommendations. Designating a specific category causes items in all other categories to be filtered out in step 190 (FIG. 5).

VI. Shopping Cart Based Recommendations (FIG. 7)

Another specific implementation of the Recommendation Service, referred to herein as shopping cart recommendations, will now be described with reference to FIG. 7.

The shopping cart recommendations service is preferably invoked automatically when the user displays the contents of a shopping cart that contains more than a threshold number (e.g., 1) of popular items. The service generates the recommendations based exclusively on the current contents of the shopping cart. As a result, the recommendations tend to be highly correlated to the user's current shopping interests. In other implementations, the recommendations may also be based on other items that are deemed to be of current interest to the user, such as items in the recent shopping cart contents of the user and/or items recently viewed by the user. Further, other indications of the user's current shopping interests could be incorporated into the process. For example, any search terms typed into the site's search engine during the user's browsing session could be captured and used to perform content-based filtering of the recommended items list.

Figure 7:
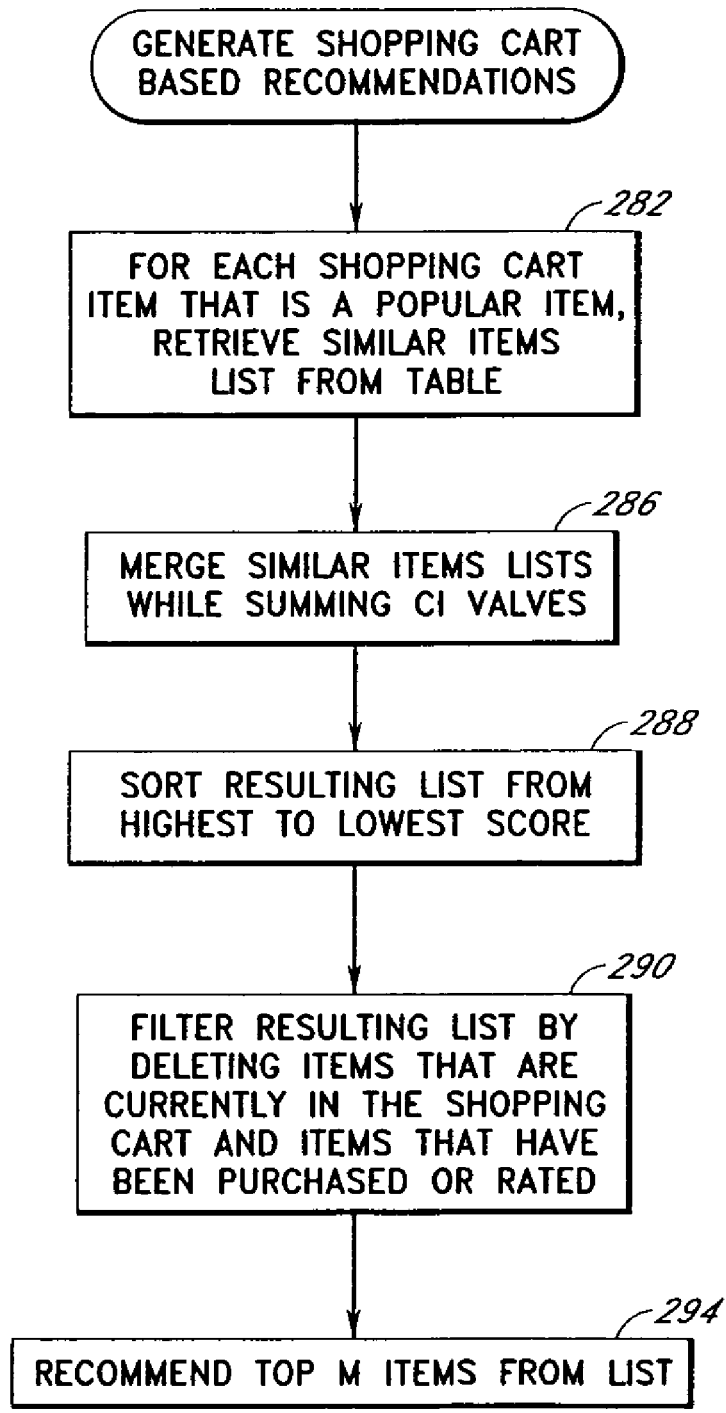
FIG. 7 illustrates another specific implementation of the sequence of steps of FIG. 2.

FIG. 7 illustrates the sequence of steps that are performed by the shopping cart recommendations service to generate a set of shopping-cart-based recommendations. In step 282, the similar items list for each popular item in the shopping cart is retrieved from the similar items table 60. The similar items list for one or more additional items that are deemed to be of current interest could also be retrieved during this step, such as the list for an item recently deleted from the shopping cart or recently viewed for an extended period of time.

In step 286, these similar items lists are merged while summing the commonality index (CI) values of like items. In step 288, the resulting list is sorted from highest-to-lowest score. In step 290, the list is filtered to remove any items that exist in the shopping cart or have been purchased or rated by the user. Finally, in step 294, the top M (e.g., 5) items of the list are returned as recommendations. The recommendations are preferably presented to the user on the same Web page (not shown) as the shopping cart contents.

If the user has defined multiple shopping carts, the recommendations generated by the FIG. 7 process may be based solely on the contents of the shopping cart currently selected for display. As described above, this allows the user to obtain recommendations that correspond to the role or purpose of a particular shopping cart (e.g., work versus home).

The various uses of shopping cart contents to generate recommendations as described above can be applied to other types of recommendation systems, including content-based systems. For example, the current and/or past contents of a shopping cart can be used to generate recommendations in a system in which mappings of items to lists of similar items are generated from a computer-based comparison of item contents. Methods for performing content-based similarity analyses of items are well known in the art, and are therefore not described herein.

Although this invention has been described in terms of certain preferred embodiments, other embodiments that are apparent to those of ordinary skill in the art are also within the scope of this invention. For example, although the embodiments described herein employ item lists, other programming methods for keeping track of and combining sets of similar items can be used. Accordingly, the scope of the present invention is intended to be defined only by reference to the appended claims.

In the claims which follow, reference characters used to denote process steps are provided for convenience of description only, and not to imply a particular order for performing the steps.

What is claimed is:

1. A computer system, comprising:
  a first component configured to generate, for each of a plurality of item pairs, a respective data value representing a degree to which only the items of the that particular pair are related to each other, said data value being dependent upon how frequently the items of the pair have co-occurred in purchase histories of a plurality of users;

a data repository which stores at least some of the data values in association with the items to which they correspond; and a second component configured to receive an input list of items selected by a user, and to use the associated data values stored in the data repository to generate an output list of items that are predicted to be of interest to the user, said input and output lists each including multiple items.

2. The computer system of claim 1, wherein the data repository comprises a mapping structure that associates related items.

3. The computer system of claim 2, wherein the first component uses the data values to select item pairs to include in the mapping structure.

4. The computer system of claim 1, wherein the first component is configured to exclude, from the data repository, data values that do not satisfy a selected condition.

5. The computer system of claim 1, wherein the input list includes at least one purchased item that was purchased by the user on a purchase date, and the second component is configured to take the purchase date into consideration in determining how much weight to give to the purchased item in generating the output list of items.

6. The computer system of claim 1, wherein the input list includes at least one item to which the user has explicitly assigned a rating, and the second component is configured to take the rating into consideration in generating the output list of items.

7. The computer system of claim 1, wherein the first component is configured to additionally take item viewing histories of users into consideration in generating the data values.

8. The computer system of claim 1, wherein the second component generates the input list of items, at least in part, by identifying items viewed by the user during browsing of an electronic catalog.

9. The computer system of claim 1, wherein the items are products represented in an electronic catalog.

10. The computer system of claim 1, wherein the items are categories of products represented in the electronic catalog.

11. The computer system of claim 1, wherein the input list is a list of items represented in an electronic shopping cart of the user.

12. The computer system of claim 1, wherein the first component is configured to generate the data values in an off-line processing mode, and the second component is configured to generate the output list substantially in real time in response to an action by said user.

13. The computer system of claim 1, wherein the second component comprises a physical server that is configured to generate personalized item recommendations substantially in real time in response to requests for recommendations.

14. The computer system of claim 13, wherein the physical server uses an item-to-item mapping structure generated by the first component to generate the personalized recommendations, said mapping structure having said data values stored therein.

15. The computer system of claim 1, wherein the second component comprises a plurality of physical servers, each of which stores (1) a replicated copy of an item-to-item mapping structure that includes said data values, and (2) executable code that uses the item-to-item mapping structure to generate item recommendations.

16. The computer system of claim 1, wherein the second component is configured to generate the output list by a process that comprises (a) for each of a plurality of items on the input list, looking up a respective set of related items, and (b) merging the sets of related items while combining data values associated with like items.

17. The computer system of claim 1, wherein the second component is configured to give different amounts of weight to different items on the input list, said amounts of weight being dependent upon user actions performed in connection with the items on the input list.

18. A computer-implemented method of providing item recommendations, comprising:

receiving a request over a network from a user computing device associated with a user;

responding to the request by obtaining item recommendation from a recommendations service, said recommendation service comprising:

a first component configured to generate, for each of a plurality of item pairs, a respective data value representing a degree to which only the items of that particular pair are related to each other, said data value being dependent upon how frequently the items of the pair have co-occurred in purchase histories of a plurality of users;

a data repository which stores at least some of the data values in association with the items to which they correspond; and a second component configured to receive an input list of items selected by the user, and to use the associated data values stored in the data repository to generate an output list of items that are predicted to be of interest to the user, said input and output lists each including multiple items; and incorporating the item recommendations into a page, and transmitting the page to the user computing device for presentation to the user.

19. The method of claim 18, wherein incorporating the item recommendations into a page comprises incorporating the item recommendations into a shopping cart page that displays contents of an electronic shopping cart of the user.

20. The method of claim 19, wherein the item recommendations are based on said contents of the electronic shopping cart.

21. The method of claim 18, wherein the method is performed in its entirety by a web server.

22. The method of claim 21, wherein the recommendation service is external to the web server, and the method comprises the web server communicating with the recommendation service to obtain the item recommendations.

23. The method of claim 18, wherein the method is performed in its entirety by a web server system that is separate from the recommendation service.

24. The method of claim 18, further comprising generating the item recommendations with the recommendation service.

25. The method of claim 18, wherein the item recommendations are personalized for the user based at least partly on an item ratings profile of the user.

26. The method of claim 18, wherein the item recommendations are personalized for the user based at least partly on past item purchases of the user.

27. The method of claim 18, wherein the item recommendations are personalized for the user based at least partly on recorded item viewing activities of the user.

* * * * *

UNITED STATES PATENT AND TRADEMARK OFFICE
CERTIFICATE OF CORRECTION

PATENT NO. : 7,908,183 B2  
APPLICATION NO. : 11/394999  
DATED : March 15, 2011  
INVENTOR(S) : Jacobi et al.

Page 1 of 1

It is certified that error appears in the above-identified patent and that said Letters Patent is hereby corrected as shown below:

At column 16, line 63, change "the that" to --that--.

Signed and Sealed this
Twenty-seventh Day of September, 2011

David J. Kappos
*Director of the United States Patent and Trademark Office*